D. SHANK.
ROAD DRAG.
APPLICATION FILED JAN. 19, 1911.
1,018,785.  Patented Feb. 27, 1912.
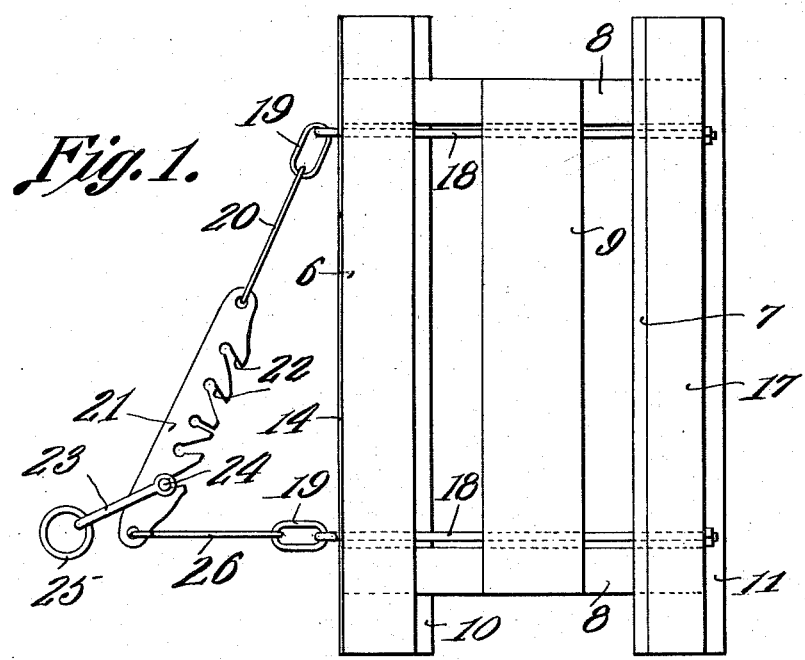
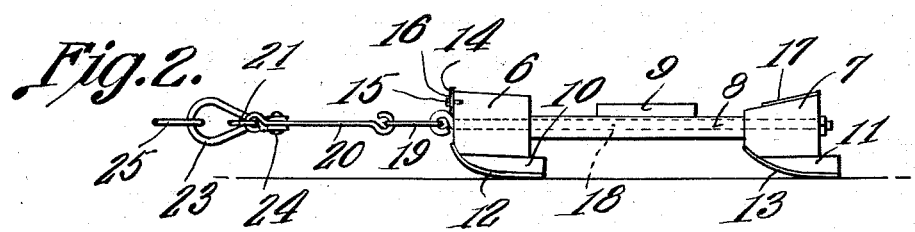
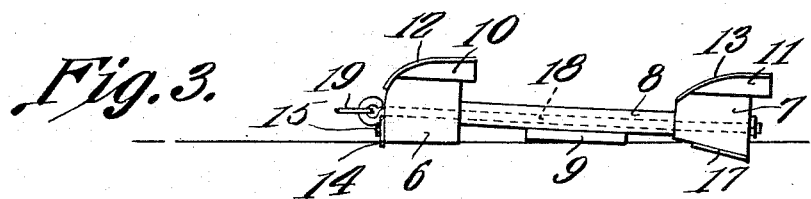
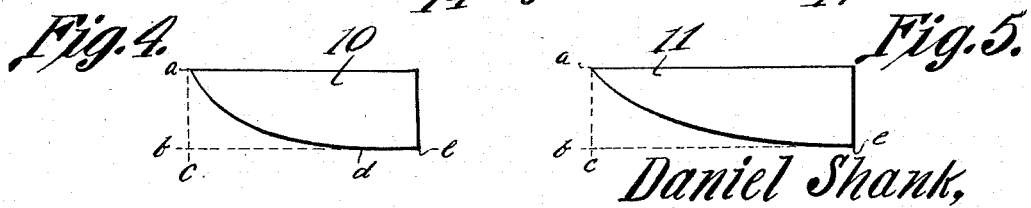
Witnesses
Daniel Shank,
Inventor
by C. A. Snow & Co.
Attorneys

UNITED STATES PATENT OFFICE.

DANIEL SHANK, OF CLAYTON, ILLINOIS.

ROAD-DRAG.

1,018,785.  Specification of Letters Patent.  Patented Feb. 27, 1912.

Application filed January 19, 1911. Serial No. 603,556.

*To all whom it may concern:*

Be it known that I, DANIEL SHANK, a citizen of the United States, residing at Clayton, in the county of Adams and State of Illinois, have invented a new and useful Road-Drag, of which the following is a specification.

It is the object of the present invention to provide an improved road and field drag and the invention aims, primarily, to provide a drag so constructed that it may be employed in treating the surface of a road or field to crush and grind all clods of dry soil, level the surface of dry or moist soil, and smooth and pack moist soil. In other words, the invention aims to provide a drag which may be employed, without any change in the arrangement of its parts, to accomplish various results in the treatment of road and field surfaces. For example, the drag is well adapted for use in crushing and pulverizing clods in a field or road and at the same time smoothing and packing the pulverized soil, and it is also well adapted for use in smoothing down and packing wet and muddy roads in such manner as to express the water from the soil to a greater or less degree and tightly pack the soil so that when it becomes dry, a hard smooth surface will be presented. The drag embodying the present invention is furthermore well adapted for use in leveling off the surface of a road or field, by cutting down the high places and depositing the soil removed therefrom, in the depressions in the surface. Also, the drag may be effectually employed in breaking down stubble, weeds, and other growths.

One of the novel features of the present invention resides in the specific form given the working beams thereof whereby they will more effectually perform their function and in so relatively forming and proportioning the front and rear working beams that they will coöperate to crush and pulverize clods and lumps of soil and smooth and press down the pulverized soil in a highly efficient manner without in any way permitting the accumulation of soil in front of these beams.

Another novel feature of the invention resides in the construction of the working beams so that by overturning or inverting the drag, a highly efficient grader will be produced.

In the accompanying drawings:—Figure 1 is a top plan view of the drag embodying the present invention. Fig. 2 is a side elevation thereof, the drag being shown in position to crush the clods and compress the surface of a road or field. Fig. 3 is a similar view illustrating the drag inverted whereby to serve as a grader. Fig. 4 is a diagrammatic view of the front beam of the drag. Fig. 5 is a similar view of the rear beam thereof.

In the drawing, the numeral 6 indicates the front beam of the drag and 7 the rear beam thereof. These beams are connected by sills 8 near their ends, and a board 9 is preferably secured upon the sills 8 and extends between the same so as to afford, in addition to the beams 6 and 7, a support upon which the driver of the drag may stand. Secured to the under side of the beam 6 is a beam 10 and a similar beam 11 is secured to the under side of the beam 7, the beams 10 and 11 being of greater width from front to rear than the respective beams 6 and 7. A sheet metal shoe 12 is secured upon the under surface of the beam 10 and lower portion of the forward side of the beam 6 and a similar shoe 13 is secured to the under side of the beam 11 and the forward and under side of the beam 7, this construction being clearly shown in Fig. 2 of the drawing. The under sides of the beams 12 and 11 are convex from front to rear on unlike paraboliform curves and the specific form of curve of the forward beam is indicated diagrammatically in Fig. 4 of the drawings and that of the rear beam is shown in Fig. 5.

The form of the forward beam will first be described, next the form of the rear beam, and then the manner in which these two beams coöperate to pulverize clods and lumps and smooth out the surface of a road or field, will be explained.

By referring to Fig. 4 of the drawings it will be observed that the shoe of the forward beam is curved from $a$ to $d$ and from $d$ to $e$ is plane, the curve at $d$ merging gradually into the plane portion from $d$ to $e$. However, the curve is substantially paraboliform and by comparing the lines $a$—$b$ and $c$—$e$ it will be observed that the line $c$—$e$, is, in proportion to the line $a$—$b$, approximately as 3 is to 1. Further it will be observed by comparing the line $d$—$e$ with the line $c$—$e$ that the former is approximately one-fourth the length of the latter so that the plane portion of the shoe is of a width from front to rear, approximately one-fourth the length of the curved portion. The object in view in forming the shoe of this specific curvature will be apparent from the following description of operation of the shoe in crushing clods and lumps. As the drag is drawn over the surface to be treated, clods and lumps, if the soil is hard and dry, will be first engaged by the portion of the shoe between *a* and *d* and will be rolled along over the surface, in advance of the shoe, and as they are rolled, will be crushed and gradually reduced in size. The portion of the shoe between *d* and *e* or in other words the plane portion thereof then passes over the pulverized or crushed particles of soil and acts to further reduce them in size. At this point it may be remarked that not only are the clods and lumps more readily reduced in size and finally pulverized, by being rolled over the surface of the ground in advance of the beam, but, owing to the fact that the shoe is curved as from *a* to *d*, accumulation of soil in advance of the shoe is obviated; that is to say the accumulation of any considerable quantity of soil and its carriage for any considerable distance is prevented.

By referring to Fig. 5 of the drawings it will be observed that the shoe of the rear beam is convex from front to rear on a paraboliform curve extending from *a* to *e* and that this shoe has no portion plane. It will further be observed by referring to the said Fig. 5 of the drawings that the line *a—b*, representing the curve of least length is to the line *c—e*, representing the curve of greatest length, approximately as 1 is to $3\frac{1}{2}$.

It is to be remarked at this point that the shoe of the rear beam, shown in Fig. 5 of the drawings, is particularly well adapted to perform a smoothing and compressing function and in fact it is intended that it shall perform this function in coöperation with the shoe shown in Fig. 4. As a consequence, as the drag is drawn over the surface of a road or field, clods and lumps of soil are crushed and pulverized by the shoe of the forward beam and the soil is then pressed down and smoothed by the shoe of the rear beam. That the beams perform these separate and distinct functions (although they coöperate to produce a single final result) is due to the peculiar form given each shoe.

In addition to being adapted for use as above described, the drag is also adapted for use as a scraper and leveler as will now be described. Upon the forward face of the beam 6 of the drag is secured a scraper blade 14. This blade is held in place and at the proper adjustment by means of bolts 15 secured into the sill and through slots 16 in the blade. The upper face of the sill 8 is located in a plane at an acute angle to its rear face and secured upon the said upper face of the sill is a shoe 17 preferably in the nature of a metallic plate. In using the drag as a scraper and grader, it is overturned so as to occupy the position shown in Fig. 3 of the drawings and is drawn over the surface of the field or road to be treated. The blade 14, traveling over the surface, will cut down the high places, and carry in front of it the soil which is removed. After the soil has been carried in this manner to a depression in the surface of the road or field, the operator will stand upon the rear sill and the continued forward movement of the drag will then result in the shoe 17 moving down and compressing the soil thus deposited.

The drag embodying the present invention has been found to be particularly useful in treating muddy roads by employing it in the manner first described. When so employed, the water in the soil will be expressed and be caused to drain off from the road surface and at the same time, the soil will be firmly compressed and packed so that when it dries a smooth and hard road surface will be presented.

The draft appliance for the drag embodies rods 18 which are secured through the beams 6 and 7 from front to rear, directly inwardly of the sills 8, which are connected to the forward ends of the rods 19 which have connected with them, in turn, link rods 26 pivoted to the ends of a draft bar 21. The bar 21 is formed with a number of notches in its rear edge and a clevis 23 has a pin 24 arranged to seat in the notches interchangeably. The clevis carries a ring 25 to which may be connected a whiffletree or other draft connection.

What is claimed is:—

A drag including front and rear beams, a beam secured to the lower face of the front beam and having the rear portion of its lower face flat to constitute a smoothing surface, the lower face of said beam being convex from the front portion of the flat surface to the front end of the beam, a beam secured to the lower face of the rear beam and having its lower surface convex from front to rear, connections between the beams, and a draft element connected to the front beam.

In testimony that I claim the foregoing as my own, I have hereto affixed my signature in the presence of two witnesses.

DANIEL SHANK.

Witnesses:
IKE L. TEACHENOR,
A. J. SCHROEDER.

Copies of this patent may be obtained for five cents each, by addressing the "Commissioner of Patents, Washington, D. C."